(12) United States Patent
Knuelle

(10) Patent No.: US 11,275,033 B2
(45) Date of Patent: Mar. 15, 2022

(54) DEVICE FOR OPTICAL INSPECTION OF EMPTY AND LIQUID-FILLED CONTAINERS

(71) Applicant: SEIDENADER MASCHINENBAU GMBH, Markt Schwaben (DE)

(72) Inventor: Matthias Knuelle, Assling (DE)

(73) Assignee: SEIDENADER MASCHINENBAU GMBH, Markt Schwaben (DE)

( * ) Notice: Subject to any disclaimer, the term of this patent is extended or adjusted under 35 U.S.C. 154(b) by 0 days.

(21) Appl. No.: 16/913,473

(22) Filed: Jun. 26, 2020

(65) Prior Publication Data

US 2020/0408702 A1    Dec. 31, 2020

(30) Foreign Application Priority Data

Jun. 26, 2019 (DE) .................. 10 2019 117 260.8

(51) Int. Cl.
*G01N 21/956* (2006.01)
*G01N 21/94* (2006.01)
*G01N 21/95* (2006.01)

(52) U.S. Cl.
CPC ..... *G01N 21/956* (2013.01); *G01N 2021/945* (2013.01); *G01N 2021/9511* (2013.01)

(58) Field of Classification Search
CPC .......... G01N 2021/945; G01N 21/956; G01N 2021/9511; G01N 21/90
USPC ..................... 356/237.1–237.6, 239.1–239.8
See application file for complete search history.

(56) References Cited

U.S. PATENT DOCUMENTS

| 4,221,961 A * | 9/1980 | Peyton ............... G01N 21/9018 250/223 B |
| 2006/0092410 A1 * | 5/2006 | Graff ...................... G01N 21/90 356/239.4 |
| 2016/0321796 A1 * | 11/2016 | Dordoni ............... G01M 11/081 |

FOREIGN PATENT DOCUMENTS

| DE | 102017201776 A1 | 8/2018 |
| EP | 0657732 A1 | 6/1995 |
| EP | 0708325 A1 | 4/1996 |
| WO | 2008040487 A1 | 4/2008 |
| WO | 2012167860 A1 | 12/2012 |

* cited by examiner

*Primary Examiner* — Tri T Ton
(74) *Attorney, Agent, or Firm* — McCoy Russell LLP

(57) ABSTRACT

The invention relates to a device for optically inspecting a container that is empty or filled with liquid, comprising an illumination unit and a recording apparatus. The illumination unit comprises an illumination surface, by means of which a two-dimensional light pattern consisting of at least two regions of different light intensities can be produced and the container can be irradiated with light from the light pattern, in particular said light can shine therethrough. According to the invention, a mirror system is further provided which is arranged in the beam path between the illumination unit and the container and comprises at least one concave mirror. The mirror system images the light pattern produced by the illumination unit onto the plane of the entrance pupil of the recording apparatus.

14 Claims, 6 Drawing Sheets

DEVICE FOR OPTICAL INSPECTION OF EMPTY AND LIQUID-FILLED CONTAINERS

CROSS-REFERENCE TO RELATED APPLICATION

The present application claims priority to German Patent Application No. 10 2019 117 260.8 filed on Jun. 26, 2019. The entire contents of the above-listed application is hereby incorporated by reference for all purposes.

TECHNICAL FIELD

The present invention relates to a device for optically inspecting containers that are empty or filled with liquid according to the preamble of claim 1.

BACKGROUND AND SUMMARY

Fully automatic optical inspection systems are used in many technical sectors, such as the pharmaceutical industry, the beverage industry or the semiconductor industry in order to identify defective products and to eliminate these products from the further production processes. Generic inspection devices typically comprise a light source for illuminating the container to be inspected and a camera for recording an image of the container.

When illuminating inspection systems of this kind, lens collimators are often used, which are, however, susceptible to image errors and, in limited installation space, require a complex construction of the inspection device that is necessary for folding the beam path. Furthermore, the maximum apertures are limited in optical systems of this kind, and this has a negative impact on the uniform illumination of the containers to be inspected, in particular for moving containers which are intended to be illuminated and imaged at multiple positions along the movement path.

In addition, in generic inspection systems, the optical effects of liquids contained in containers can only be taken into consideration using complicated and expensive optics, but these are essential for accurate inspection results.

Against this background, the problem addressed by the present invention is to provide a device for optically inspecting containers which has a simple and cost-effective construction and makes it possible to inspect containers that are empty or filled with a liquid with optimal illumination.

According to the invention, this problem is solved by a device having the features of claim 1. Accordingly, the device according to the invention for optically inspecting a container that is empty or filled with liquid comprises an illumination unit and a recording apparatus. The illumination unit comprises an illumination surface, by means of which a two-dimensional light pattern consisting of at least two regions of different light intensities can be produced and the container can be irradiated with light from the light pattern, in particular said light can shine therethrough. The light pattern is two-dimensional, i.e. has a certain two-dimensional extent when viewed from the recording apparatus, and is not only a punctiform light source.

According to the invention, a mirror system is further provided which is arranged in the beam path between the illumination unit and the container and comprises at least one concave mirror. The mirror system images the light pattern produced by the illumination unit onto the plane of the entrance pupil of the recording apparatus.

By means of the mirror system, the light from the illumination unit is deflected towards the container and the recording apparatus. The mirror system therefore has the function of a "field lens" for the light, as a result of which the luminous efficiency is significantly increased. Furthermore, the beam path is "folded" by the mirror system in a natural manner, and therefore a very compact construction of the device according to the invention is possible. If yet more compact arrangements are required, the beam path can be folded by additional mirrors. In the simplest case, an additional plane mirror can be used for this purpose, but a combination of mirrors of any form is also conceivable.

The mirror system is designed such that (i.e. in a one-mirror system, the mirror surface of the single concave mirror is shaped in a such a way) the plane of the light pattern (=object plane) produced by the illumination surface is imaged onto the plane of the entrance pupil of the recording apparatus and therefore functions as a collimator. An image of the light pattern is thus obtained in the plane of the entrance pupil (=image plane). As a result, any inhomogeneities in the illumination that are potentially present (e.g. dust or other dirt, but also intensity gradients or patterns intentionally introduced by the light pattern) are not visible in the image recorded by the recording apparatus.

The optical imaging onto the plane of the entrance pupil requires the recording apparatus to see the almost identical illumination conditions in the entire image field. This is important in particular for moving containers, since in this case multiple images are recorded while the container is moving in the image field of the recording apparatus, the illumination conditions having to remain identical in order to achieve an accurate inspection result.

Another advantage of the mirror system functioning as a collimator consists in that the character of the illumination of the relevant application can be adapted in wide ranges by different light patterns without the light pattern itself being visible in the image field of the recording apparatus. In particular for moving containers, the movement of the container and, if there is a liquid in the container, the high refractive power of the liquid column can be thus also be taken into account. This cannot be displayed with a background light alone.

Depending on the application, distances between the illumination surface and mirror system or between the mirror system and recording apparatus that differ from the ideal positions can be tolerated. Different distances between the container and recording apparatus can be corrected by "refocusing" the distance between the illumination surface and mirror system in a certain range without another configuration of the mirror system being required, since the theoretically error-free imaging of the light pattern on the optical axis of the recording apparatus is not necessary and cannot be achieved in the field either.

The term "light" is not restricted to visible light in the present case, but generally covers electromagnetic radiation of any wavelength such as UV X-ray and infrared radiation, and visible light.

Advantageous embodiments of the invention are found in the dependent claims and the following description.

In one embodiment, it is provided that the mirror system does not comprise a lens. Furthermore, it may be provided that the entire device does not comprise any lenses.

A collimator that is solely constructed with mirrors has numerous advantages over a system based on lenses. The limited installation space in a typical inspection device thus poses a problem since it requires short distances and thus short focal lengths. In order to achieve the required high total refractive power, two aspherical lenses are generally required. The refractive powers that can be achieved with a single lens therefore typically make it necessary to fold the beam path using a plane mirror.

In order to guarantee full and/or uniform illumination for moving containers over the entire movement range, the lenses also have to be dimensioned to be sufficiently large. The required diameters and refractive powers are unlikely to be achieved using cost-effective materials such as PMMA, and therefore high-index lenses are required.

Furthermore, a mirror system is simpler and more cost-effective to produce than a collimator based on lenses. While just one optical surface needs to be produced in a one-mirror system, four surfaces need to be produced in a two-lens system. In order to prevent scattered light and ghosting, all the lens surfaces need to be optically polished and need to have a high-quality anti-reflective coating.

Furthermore, correction of the color defect of a lens collimator is ruled out on account of the lens required for this purpose having negative refractive power and the associated extension of the focal length of the system. Mirrors do not have any color defects, however.

Lastly, the distance of the container-side glass/air surface, which is shorter in a lens system, means that dirt (e.g. dust) is visible in the image on this surface due to the depth of focus of the recording apparatus focused on the container and the inspection results may be impacted negatively.

Therefore, a collimator based on lenses has considerable drawbacks:

Considerably higher costs due to the material (high-index lenses), the number of optical surfaces and the required anti-reflective coating.

With high-index lenses, too, the apertures that can be achieved are limited, and therefore disadvantageous compromises have to be made when illuminating the containers.

Despite the coating, dust not only results in scattered light, but can also become directly visible in the image and result in incorrect inspections, since the distances from the lens surfaces are shorter than the distance from said container to an obliquely arranged mirror.

Despite the coating, there is the risk of faint ghosting, caused by reflections on the very taut, i.e. highly curved surfaces of the lenses, which can result in defective inspection results.

The lack of color correction of the lenses means that the light pattern is only imaged in focus onto the plane of the entrance pupil for one color or wavelength, but for all other wavelengths said light pattern is imaged out of focus. This results in a colored light background, which also can be perceived by a black-and-white camera as a scattered-light background and can considerably reduce the contrast of the image.

For very compact constructions, an additional mirror may be required for folding, which further increases the costs.

Cost-effective plastics materials (e.g. PMMA) can be used if compromises are made with the illumination (e.g. smaller lens diameter). However, there is no possibility of retroactive coating, which results in drawbacks with regard to ghosting and scattered light.

The above-described drawbacks of a lens system precisely correspond to the advantages of the mirror system according to the invention:

The mirror(s) ensures/ensure pure-color imaging, i.e. does not result in a colored "scattered-light background" or any color fringes on the bright-dark transitions in the image.

Disruptive reflections and "ghosting" are prevented.

The imaging and beam deflection can be carried out using a common mirror surface. A compact beam path is thus obtained without additional elements, and this beam path is generally highly advantageous for installation in inspection machines.

A one-mirror system comprising just one optical surface is sufficient for many applications, which results in a great cost advantage.

Even with a one-mirror system, considerably larger apertures can be provided than with lenses at a reasonable cost, which makes it possible to illuminate the containers in an improved manner. This is also important in particular for the particle inspection.

Using two-mirror and multi-mirror systems, the inspection device can be designed to be even more compact and even more extreme beam paths can be implemented.

The requirements placed on the quality of the polish for mirrors are lower than for lenses; they only need to be level.

The larger distance between the mirror surface and the container ensures that dust and dirt is not imaged in focus with small stops, i.e. with a greater depth of focus of the recording apparatus. This dust and dirt on the mirror is therefore not visible in the image.

If optional protective screens are desired between the mirror system and the containers for protecting the mirror(s), it is once again possible to image the dust. Corresponding screens having very high-quality coatings are, however, available as mass-produced goods comparatively cost-effectively. They can be much more easily cleaned and can also be replaced without high costs if they are damaged (e.g. scratched). However, it is often recommended that protective glass be provided in a lens system, since the containers can get broken (e.g. breakage of glass) when installing the machines.

The mirror system preferably comprises one or, if necessary, two or more spherical and/or aspherical mirrors (the mirror surfaces of which in particular correspond to conical sections). The design of the mirror optics is in particular coordinated with the positions of the recording apparatus and illumination unit. With more than one mirror, the mirror system may also comprise one or more planar mirrors for beam deflection.

In another embodiment, it is provided that the concave mirror comprises an ellipsoid mirror surface and is arranged such that one of the focal points of the ellipsoid defining the mirror surface lies on the light pattern and the other focal point lies on the entrance pupil of the recording apparatus. The mirror surface of the concave mirror is thus preferably a segment of a rotational ellipsoid. If there are lower requirements placed on the inspection device, simpler mirror forms can also be used, however.

In another embodiment, it is provided that the deflection angle of the concave mirror is less than 135°, preferably less than 100°. More preferably, the deflection angle is greater than 30°. The deflection angle is defined here as the angle between the imaginary extension of the optical axis before it impinges upon the mirror and of the optical axis deflected by the mirror. Complete back reflection would therefore correspond to a deflection angle of 180°.

This applies accordingly to a multi-mirror system, i.e. when the mirror system comprises a plurality of mirrors, preferably to all the mirrors. In general, it is therefore preferable for no back reflection to take place in the mirror system. At a deflection angle of 180°, i.e. back reflection towards the recording apparatus, a light source could not be placed in the region of the recording apparatus, for example. The illumination surface of the illumination unit would be interrupted at this point, which makes bright-field illumination impossible, for example.

In another embodiment, it is provided that bright-field illumination and/or dark-field illumination and/or a combined bright-field and dark-field illumination having different wavelengths for the bright-field and the dark-field irradiation can be produced by means of the illumination unit. The illumination that is used can be set by producing a corresponding light pattern by means of the illumination unit. The device according to the invention thus provides a high level of flexibility for inspecting the containers. The term "wavelength" in this case means a defined wavelength or a certain wavelength range. In the latter case, the wavelength ranges or spectral ranges of the illumination regions or illumination surfaces of the illumination unit that are used for the bright-field and dark-field illumination differ.

In bright-field illumination, ideally only that part of the illumination surface for irradiating the container which is imaged under the assumption of an undisrupted beam path (which, in a good approximation, is also fulfilled with a defect-free empty container) into the entrance pupil of the recording apparatus is used. Therefore, for an illumination surface of which the imaging has a larger extent than the entrance pupil, only the central region of the illumination surface is used for solely bright-field illumination (i.e. "hard" collimated light), the light from which surface enters the entrance pupil. The remaining area of the illumination surface is darkened or blocked off. With a circular entrance pupil (for example defined by a circular aperture stop), only a central circular region of the illumination surface is therefore used to illuminate the container.

For solely dark-field illumination, the entire area of the illumination surface can be used, and the above-described central region can be darkened (with a circular entrance pupil, the central circular region of the illumination surface).

The center of the illumination surface is defined in the present case as the intersection point of the optical axis of the recording apparatus, deflected by the mirror system (i.e., if said apparatus comprises a lens, the optical axis of the lens).

In order to also cover the smallest possible, flat scattering angles without losing the character of the dark-field illumination, the central shading or darkening of the illumination surface is in particular selected to be large enough that the imaging thereof by the mirror system reliably completely covers the entrance pupil of the recording apparatus. Here, if a lens is used and if it is necessary, the angle of the shading of the lens can even be taken into account. The range towards large scattering angles is then limited solely by the size of the mirror(s) of the mirror system (i.e. the effective size of the collimator) and of the illumination surface.

The imaging of the light pattern designed in this way (i.e. the combination of bright and darkened regions) results in the image captured by the recording apparatus being uniformly illuminated in bright-field illumination, but otherwise having no structure (in particular no structures coming from the light pattern). In dark-field illumination, however, no light enters the camera, meaning that the image captured by the recording apparatus appears dark irrespective of the intensity of the light.

However, this is only applicable as long as there is no material disrupting this beam path between the mirror system and the recording apparatus. An ideally homogeneous glass screen without any dirt thereon or a homogeneous liquid layer remain invisible even if they are arranged in the object-side focus of the recording apparatus. If, however, there is "disruption", for example a defect (e.g. a crack, streak, etc.) in the glass or a particle in the liquid, the light is deflected at this point (i.e. refracted, reflected and/or scattered). In bright-field illumination, this deflection becomes noticeable as a bright-dark pattern or a dark "shadow" in the image from the recording apparatus. In dark-field illumination, however, light which would normally miss the entrance pupil is deflected into the entrance pupil by the disruption, and therefore the disruption becomes visible in the image as a brightened area.

Ideally, the recording apparatus (or, when using a lens, the lens) is focused on the container. In this way, any disruptions on the surface and/or in a liquid in the container are imaged in focus and even very small particles or material defects become visible.

When using dark-field illumination, for many applications it is crucial that defects in the container or particles in the liquid are illuminated from as many different directions as possible. In particular, unevenly shaped particles (e.g. glass particles) only scatter or reflect the impinging light in a few directions. If light only impinges upon the particle from a single direction, whether or not the light deflected by the particle enters the entrance pupil of the recording apparatus is dependent on the orientation of said particle relative to the optical axis of the recording apparatus. There is therefore a high probability that particles of this kind cannot be traced in every image in an image series and that incorrect results arise. If, however, the light is incident on the container from different directions, the particles can be continuously detected. It behaves similarly to the way in which it behaves in the event of defects in glass (i.e. a local breakage of glass). Here too, the position of the defect determines how much light is reflected or deflected in which direction.

In order for it to be possible to scan all sides of the container for material defects, when scanning for material defects, a plurality of images of the container can be captured and the container can be rotated ("rolled") for this purpose.

The requirement that the container be irradiated with light from the illumination unit from as many different directions as possible can be met by means of a sufficient large illumination surface or a sufficiently large light pattern and a mirror system having sufficiently large dimensions.

In another embodiment, it is provided that the container is moved relative to the device by means of a transport apparatus, for example a conveyor belt or a rotatable holder. The movement of the container through the device according to the invention or through the image field thereof can be carried out along a curved path (e.g. a circular path) or linear path and either continuously or in cyclic operation. The illumination apparatus, the mirror system and the recording apparatus are preferably arranged such that the optical axis of the recording apparatus is oriented substantially perpendicularly to the movement direction of the container, and it is possible for the container to be illuminated by the illumination apparatus along an extended section of the movement path of said container and for an image of the container to be detected by the recording apparatus.

For example, a plurality of images of the container can be captured at a plurality of positions on the section. It may also be provided that the container is rotatably mounted on the transport apparatus, for example on a rotary plate, such that a plurality of images can be captured from different angles or viewing directions. The movement direction of the container is preferably perpendicular to the optical axis of the recording apparatus and to the longitudinal axis of the container.

In another embodiment, it is provided that the light pattern comprises at least one dark region which does not emit any light or from which no light originates. In dark-field illumination, the darkened region is preferably the central region of the illumination surface, such that, without "disruption" in the beam path, no light enters the entrance pupil. In bright-field illumination, however, preferably only the central region of the illumination surface is used for irradiation, while the remaining area of the illumination surface is darkened. The light pattern that is used in dark-field illumination can in particular be inverted to form the light pattern for the bright-field illumination. The dark region can be produced by accordingly actuating or programming the light sources of the illumination surface and/or by using a corresponding stop.

In another embodiment, it is provided that the illumination unit is configured to produce a light pattern having at least two regions, which emit light at different wavelengths. For example, it can thus be provided that the region usually used for dark-field illumination emits light having one wavelength and the region usually used for bright-field illumination emits light having another wavelength. Again, the term wavelength can be used to mean wavelength range. By separating the different wavelengths and by accordingly processing the measured signals or captured images, the proportions of the bright-field and dark-field illumination can be separated from one another and analyzed separately. Polarizing filters can be used for this purpose. Combined illumination of this kind having a plurality of spectrally encoded regions can, for example, be used for detecting air bubbles in the liquid column of the container.

In another embodiment, it is provided that the spatial arrangement and/or the light intensities and/or the wavelengths of the regions of the light pattern can be varied. For example, it can be provided that light patterns of different shapes can be produced by means of the illumination unit in order to adapt the illumination to different containers and/or different container positions. It is also possible to switch between bright-field and dark-field illumination by inverting the light pattern (i.e. bright regions are darkened and vice versa).

In another embodiment, it is provided that the light from the illumination unit does not impinge upon the container surface or on the container in parallel, with the light pattern not being imaged on the container surface or container. The light from the illumination surface therefore does not impinge upon the mirror system such that it is already collimated, but is first collimated thereby and imaged onto the plane of the entrance pupil. This results in the container arranged behind the mirror system in the beam path being illuminated from different directions and, if the mirror system and illumination surface have accordingly large dimensions, also being uniformly illuminated at different positions on a movement path through the image field. By producing relatively large illumination angles for each point on the container, the greatest possible light scattering by particles and defects in glass towards the recording apparatus is achieved.

In another embodiment, it is provided that the illumination surface is an LED matrix that preferably comprises individually actuatable LEDs. In particular, it may be a printed circuit board comprising an LED matrix and a downstream diffuser plate. Depending on the application, white, colored or monochrome or RGB LEDs can be used here. With monochrome LEDs, bright-dark patterns can also be produced by individually actuating the individual LEDs. With RGB LEDs, colored patterns or color gradients can additionally be produced, with a color camera preferably being used in this case to capture the images. Since unpolarized light is typically obtained here, for example linear polarization having a polarizing direction that can be selected as appropriate can be produced as required by arranging a polarizing filter downstream. With individually actuatable LEDs, the light pattern can be produced by directly displaying a corresponding pattern or image.

The illumination surface can also be produced by a TFT screen, for example an LED TFT or LCD TFT screen. The light pattern can also be produced by directly displaying a corresponding pattern or image. Since linearly polarized light is generally obtained in a TFT screen, a polarizing filter, in particular a circular polarizing filter, could be used in order to modify the polarization of the illumination.

In another embodiment, it is provided that at least one stop, which is arranged between the illumination surface and the mirror system, is provided for producing the light pattern. This is particularly suitable for an illumination surface comprising light elements or sources that cannot be individually actuated, for example for an LED matrix without individual LED actuation. The dark regions of the light pattern are then achieved by providing a corresponding stop or a combination of a plurality of stops. The advantage here is the lower cost for the illumination surface as well as the higher contrast and a higher attainable luminance. The stop can be adapted or replaced for different containers in order to produce different light patterns. The shape of the stop can be mechanically or electronically adapted or modified. Furthermore, an additional, separate TFT panel can be positioned between the LED illumination surface and the mirror system in front of a diffuser, such that the TFT panel is in the light-side focus of the mirror system and the light pattern is achieved by corresponding programming.

Advantageously, the light pattern can be varied over time, both with regard to the intensity and the color or wavelength, whether by means of stops, by individually actuating the LEDs of an LED matrix, by displaying suitable images on the TFT screen or by separately actuating one or more additional TFT panels.

In another embodiment, it is provided that a region of the light pattern is designed as a strip, in particular as a bent or curved strip, which is preferably oriented symmetrically to the optical axis of the recording apparatus. In particular, the strip is mirror-symmetrical to the plane which is spanned by the optical axis of the recording device and the optical axis deflected by the mirror system. In dark-field illumination, the strip is in particular dark or darkened, while the regions outside the strip are illuminated or not darkened. In bright-field illumination, this is in particular in reverse, such that only light from the strip is used for illumination and the remaining regions are dark or darkened. In a curved strip, the center of the illumination surface defined in the above sense can be located in the curved region, in particular at the vertex thereof. For a moving container, the strip is in particular oriented in the direction of the container movement symmetrically to the optical axis of the recording apparatus.

The above configurations for bright-field and dark-field illumination relate to containers which only marginally influence the beam path of the illumination. This applies in a limited manner to empty containers or empty container regions (e.g. above the fill level). When inspecting medication containers, both the walls of the containers and the contents thereof, in particular a completely or partly transparent (possibly colored) liquid, should be inspected, for example. The liquid column in the cylindrical containers has high refractive power. For this reason, with filled containers, the illumination surface or light pattern needs to be modified.

A container filled with liquid constitutes a cylindrical lens. This "container lens" ensures that light from a collimated (not diffuse) light source only enters the recording apparatus in a narrow strip in the center of the container, in parallel with the container axis. The light does not shine through the edge regions of the container from the perspective of the recording apparatus.

By adapting the light pattern, bright-field illumination having significantly improved illumination can be achieved. For this purpose, a suitably shaped light strip (or, for dark-field illumination, a darkened strip) which substantially covers the entire region of the illumination surface is advantageously used instead of the above-described central illumination surface. The optimal shape of the strip can e.g. be determined by "backward calculation", by the entrance pupil being assumed to be the "light source" and the imaging thereof through the container via the mirror system onto the illumination surface of the illumination unit being calculated. In a one-mirror system having 90° beam deflection, a curved structure for the strip is obtained, for example.

In order to achieve complete illumination, a large enough mirror has to be selected. The enlarged illumination surface is advantageous for finding defects in glass (e.g. local cracks in glass). This surface ensures that the defects are irradiated from multiple directions and are thus reliably identified.

This adaptation of the light pattern applies similarly to the dark-field illumination. With central circular shading or darkening, laterally incident light is refracted through the liquid column towards the recording apparatus by the cylindrical container lens, such that the edge regions appear bright. If the above-described light pattern having the curved strip for the bright-field illumination is inverted, i.e. only the curved region is shaded or darkened, the entire container surface appears dark. Since the shaded area is ideally still small compared with the total illumination surface, this additional shading barely restricts the lighting effect at all. The large remaining illumination surface still ensures that particles in the liquid are illuminated from all possible directions such that, even with highly irregular particle surfaces (e.g. glass particles and fibers), the probability is very high that light from a particle is also scattered towards the recording apparatus at all times and the particle is illuminated brightly in the image, with a high bright-dark contrast at the same time. The same also applies to cracks in glass, the visibility of which can likewise highly depend on the direction of incidence of the light. Dark-field illumination that is optimized for cylindrical containers filled with liquid is thus obtained.

If the containers are moved perpendicularly to the optical axis of the recording apparatus, as in an inspection machine, the ideal light pattern changes (i.e. the shape and arrangement of the bright and darkened surfaces) only slightly. The slight shifts can be taken into account by the ideal light patterns of the different container positions for the relevant movement range of the container being combined to form a common area, i.e. to form a common, accordingly widened or shaped strip-shaped region. In the case of bright-field illumination, these are the bright regions, and in the case of dark-field illumination, these are the dark areas.

Preferably, when using a programmable illumination surface (e.g. LCD or LED screen), the area can be adapted for each container position, i.e. for each individual image. This can be controlled by a separate trigger signal for the light ("strobe signal"), for example.

In particular, the mirror system and the illumination surface have sufficiently large dimensions that sufficient illumination is ensured in the entire movement range of the container. Therefore, the combination of the above-described mirror optics and the light pattern coordinated with the container result in an inspection device having optimal properties not only for a fixed container position, but also for containers which are being continuously moved in an inspection machine. Even if a plurality of images are required for the automatic inspection at different times, the illumination conditions only change in a negligible manner from the perspective of the recording apparatus.

Of course, optimizing the light pattern, with a direct orientation towards the inspection result, is possible at any time. Theoretical calculations and simulations, such as the above-described "backward calculation", generally provide a first approach. Therefore, for example, influences such as the material quality of the container can be taken into account (for example, differences between tubular glass and molded glass; molded glass shows considerably more, clearer streaks, and therefore higher contrasts could be "set" for tubular glass).

The method for precisely adapting the light pattern operates in such a sensitive manner that the illumination of the radii in the region of the container base can also be optimized, which demonstrably results in an improvement to the inspection results. For this purpose, the light patterns that were theoretically identified and combined by backward calculation are systematically slightly varied, and therefore are successively further optimized.

For highly demanding applications, it is also conceivable to rapidly adapt the light pattern. This is significant in particular when slight variations in the optimal light pattern in relation to the container position in the movement range are intended to be compensated for. However, it is also possible to use different light patterns as part of an inspection of a type of container or to adapt to different containers in a single inspection process.

For special applications (e.g. differentiating air bubbles), the individual regions of the light pattern can also be colored, i.e. can emit light having different wavelengths. For this purpose, reference is explicitly made to EP 3 312 592 A1. Therefore, bright-field illumination of a color can be combined with dark-field illumination of one or more other colors in the illumination surface or light pattern, for example.

For other applications, the light pattern can preferably be varied randomly. Continuous brightness gradients and/or color gradients are also conceivable. The mirror shape can also be adapted to special applications. Furthermore, when using screens or LED area lights comprising individually actuatable RGB LEDs as the illumination surface, the contours and colors of the individual regions of the light pattern can be adapted as desired.

In addition, the mirror system used as a collimator in the device according to the invention also increases the luminous efficiency compared with purely diffuse background light owing to its light-collecting properties, such that illumination surfaces or light sources having a lower luminance can also be used, which reduces costs.

In another embodiment, it is provided that a polarizing filter is provided, by means of which the polarization of the light emitted by the illumination unit can be modified. This may be a linear or circular polarizing filter. Different polarizing filters can also be provided for different regions of the light pattern.

In another embodiment, it is provided that the recording apparatus comprises a camera and preferably a lens arranged between the container and the camera. The entrance pupil of the recording apparatus is then the entrance pupil of the lens.

In another embodiment, it is provided that the container is cylindrical and completely or partly transparent, the container preferably being a syringe, a vial (i.e. injection vials), an ampoule, a carpule or a cartridge. The container can be filled with a translucent or transparent liquid or with a slightly turbid or partly transparent liquid, provided that it is possible for light to shine through the container and thus for an inspection to be carried out in the transmission mode. The liquid can also be colored.

In addition to the inspection of containers that are empty or filled with a liquid, the device according to the invention is also suitable for the inspection of containers that have been filled up to a certain level with any contents, for example solid contents. Above the fill level, the inspection then corresponds to the inspection of an empty container. For example, it is conceivable for the device according to the invention to be used for the inspection of lyophilizate products which are filled with a freeze-dried substance up to a certain fill level.

BRIEF DESCRIPTION OF FIGURES

Further features, details and advantages of the invention are found in the following embodiments, which are explained with reference to the drawings, in which.

DETAILED DESCRIPTION

Figure 1:
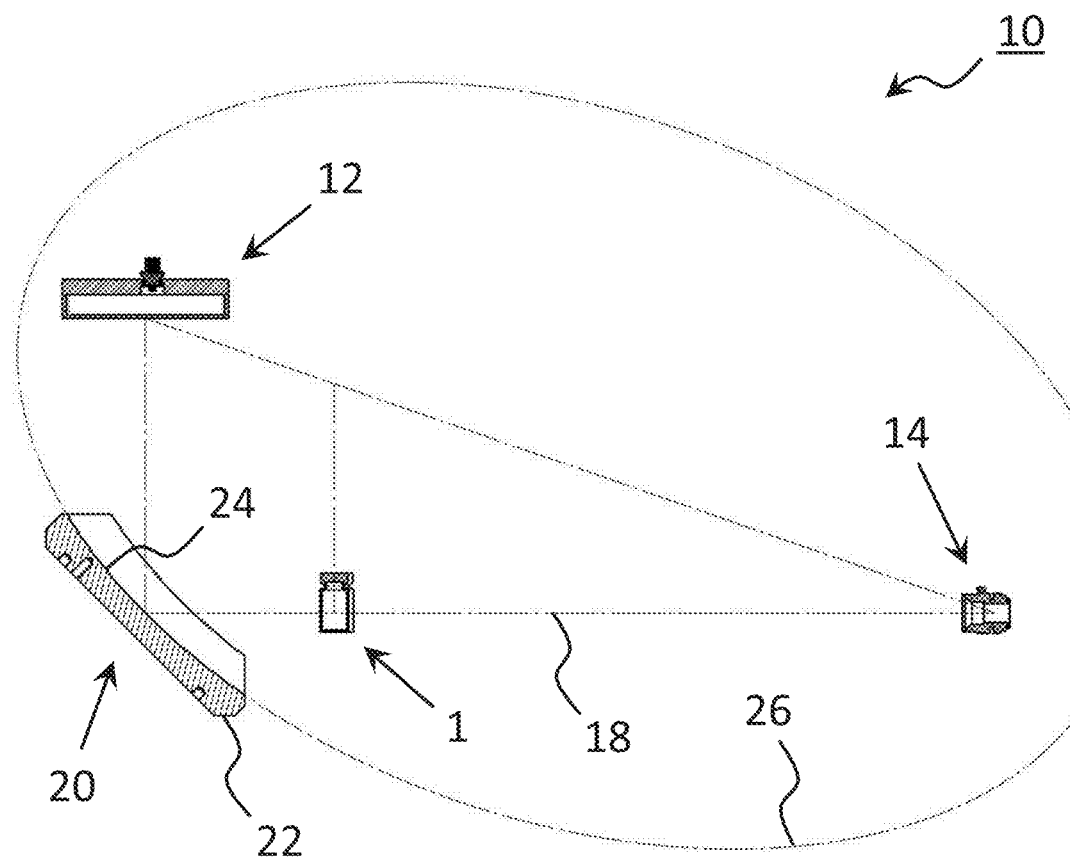
FIG. 1 is a schematic side view of an embodiment of the device according to the invention.

FIG. 1 is a side view of an embodiment of the device 10 according to the invention as a section along the plane of symmetry of the device 10. The device 10 is used for the automatic inspection of transparent, cylindrical containers 1, in particular medication containers such as ampoules, vials, syringes or cartridges, which may be empty or filled with a partially or completely transparent liquid. The device 10 according to the invention is therefore explicitly suitable for the inspection of cylindrical containers 1 filled with liquid.

The device 10 comprises an illumination unit 12 comprising an illumination surface 13, which can e.g. be produced by a simple background light comprising a diffuser, a mirror system 20, functioning as a collimator, which comprises a single concave mirror 22 (one-mirror system) and a recording apparatus 14, which comprises a camera and a lens 17. A container 1 to be inspected, which in this case is arranged in the center of the camera field in the plane of symmetry of the device 10, is positioned between the mirror 22 and the recording apparatus 14. The container 1 is moved through the image field of the camera perpendicularly to the central plane, e.g. on a circular path, by a transport apparatus (not shown). The container 1 is illuminated in transmission mode (i.e. transmitted-light illumination).

The mirror 22 comprises a concave, ellipsoid mirror surface 24 and images the illumination surface 13 or the light pattern 30 produced by the illumination unit 12 onto the plane of the entrance pupil 16 of the lens 17 of the recording apparatus 14. The deflection angle of the mirror 22 is 90°, and therefore a compact, folded beam path is produced. An outline for showing the rotational ellipsoid 26 that defines the mirror surface 24 is sketched onto FIG. 1. The illumination surface 13 and the entrance pupil 16 of the lens 17 are positioned in the two focal points of the ellipsoid 26. The sketched lines mark the ellipsoid 26 producing the ellipsoid mirror 22 together with the connecting line of the focal points (=rotational axis of the ellipsoid 26), the optical axis 18 of the camera optics, its 90° deflection towards the illumination unit 12, as well as the position of the container 1 when it passes the plane of symmetry of the device 10.

Depending on the shape of the light pattern 30, dark-field or bright-field illumination can be produced by the illumination unit 12 of the device according to the invention. The light pattern 30, i.e. the two-dimensional pattern made up of bright and dark regions, can be produced by an illumination surface 13 comprising corresponding stops 11 or a programmable illumination surface (e.g. LCD or LED screen).

Figure 2A:
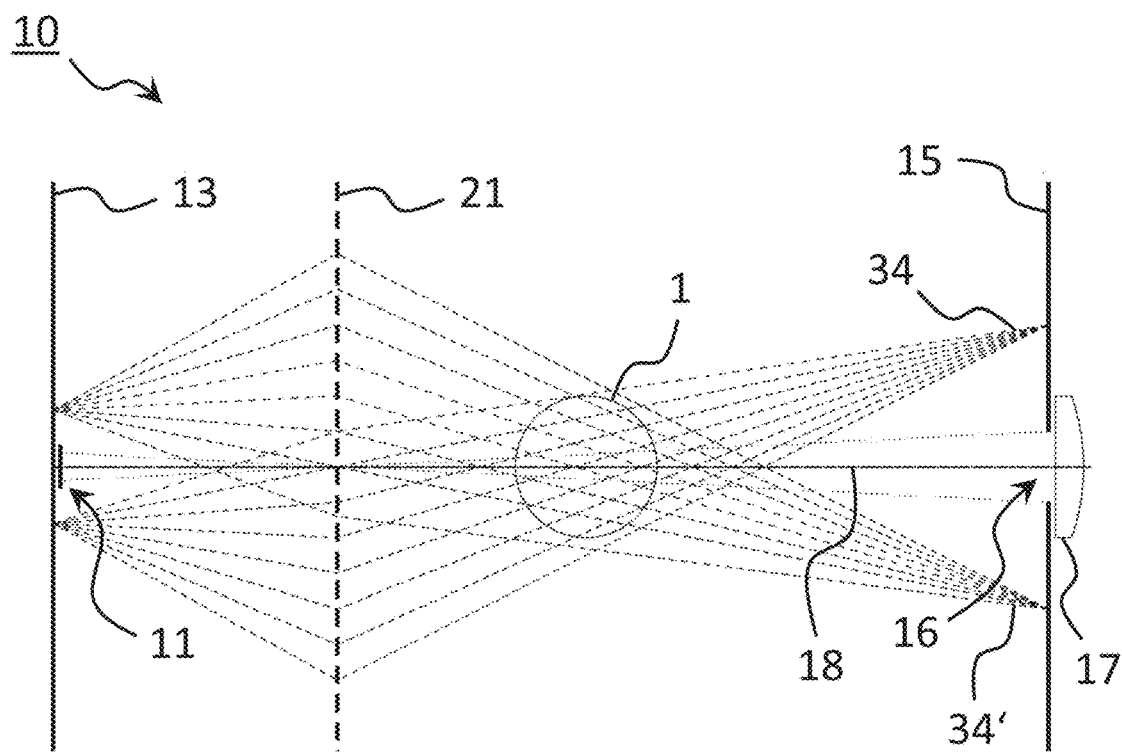
FIG. 2A is a schematic plan view of the beam path of two light points on the illumination surface through an empty container positioned in the center of the image field in dark-field illumination.
Figure 2B:
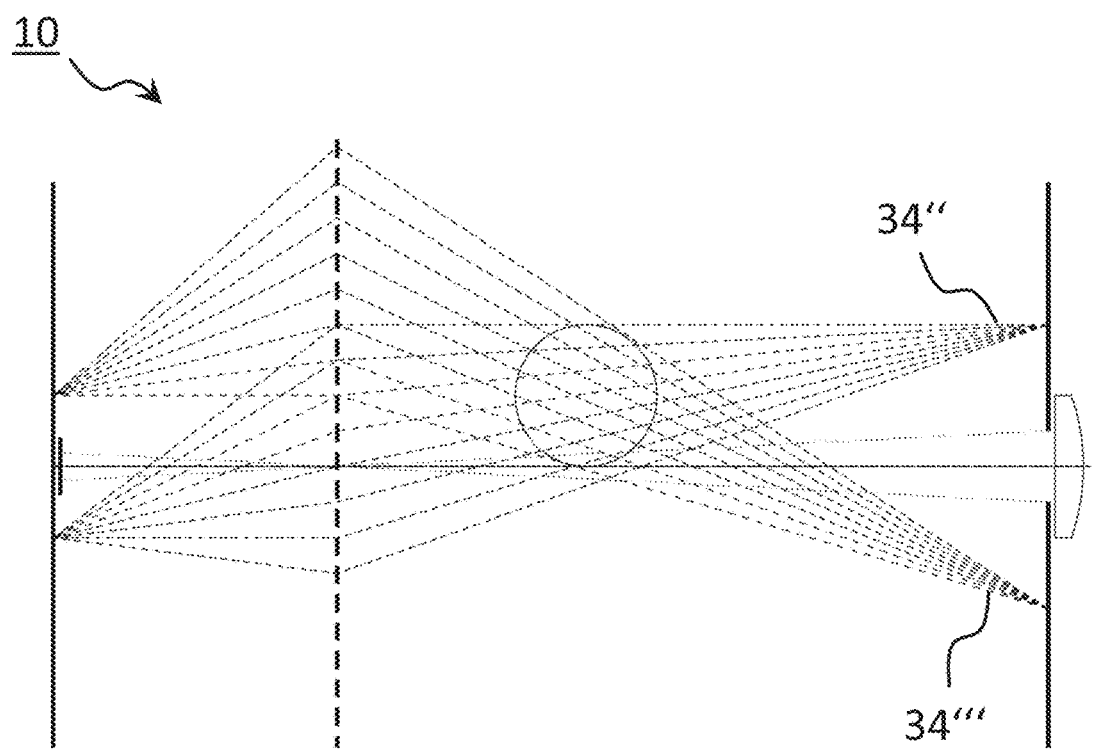
FIG. 2B shows the beam path of two light points on the illumination surface through an empty container positioned outside the center of the image field in the view according to FIG. 2A.

FIG. 2A-B schematically show, from above (i.e. perpendicularly to the container axis), the beam path of two beam fans 34 that are completely irradiating an empty container 1 starting from two exemplary light points on the illumination surface 13. The left-hand line constitutes the illumination surface 13, in the center or central region of which a stop 11 for dark-field illumination is arranged between the illumination surface 13 and the mirror 22. The main plane of the ellipsoid mirror 22 is shown by a dashed line, whereas the container 1 to be inspected is marked as a circle. The lens 17 of the recording apparatus 14 together with its entrance pupil 16 is positioned on the right-hand side. The stop 15 arranged in front of the lens 17 shown in FIGS. 2A-B and 3A-B schematically represents the entrance pupil 16 of the lens 17. The stop 11 for darkening the central region of the illumination surface 13 at least has sufficiently large dimensions such that, without the container 1 or with a merely empty container 1 in the beam path, no light enters the entrance pupil 16 (the darkened region between the illumination surface 13 and the entrance pupil 16 and the imaging of the stop 11 are shown by the dotted lines). The horizontal dashed-dotted line 18 constitutes the optical axis of the lens 17, which simultaneously extends in the symmetrical plane of the entire device 10.

In FIG. 2A, the container 1 is located in the center of the camera field (i.e. the container axis lies in the plane of symmetry). In FIG. 2B, the container 1 has been moved "upwards". The drawings show that, when the collimator or mirror 22 and illumination surface 13 are of sufficient size, the container 1 is illuminated from all sides, with other beam fans 34 from each light point on the illumination surface 13 having an effect depending on the container position. Light that has already been collimated at the source (e.g. LEDs having their own lenses) therefore might not achieve this effect, in particular it cannot replace the mirror 22.

The dark-field illumination shown in FIG. 2A-B cannot be used with cylindrical containers 1 filled with liquid, however, since the liquid column in the containers 1 has high refractive power. An undisrupted beam path, as shown in FIG. 2A-B, can no longer be assumed in this case. Therefore, a modified light pattern 30 is used, in which the central region is replaced by a curved strip 32 extending substantially over the entire width of the illumination surface 13.

Figure 3A:
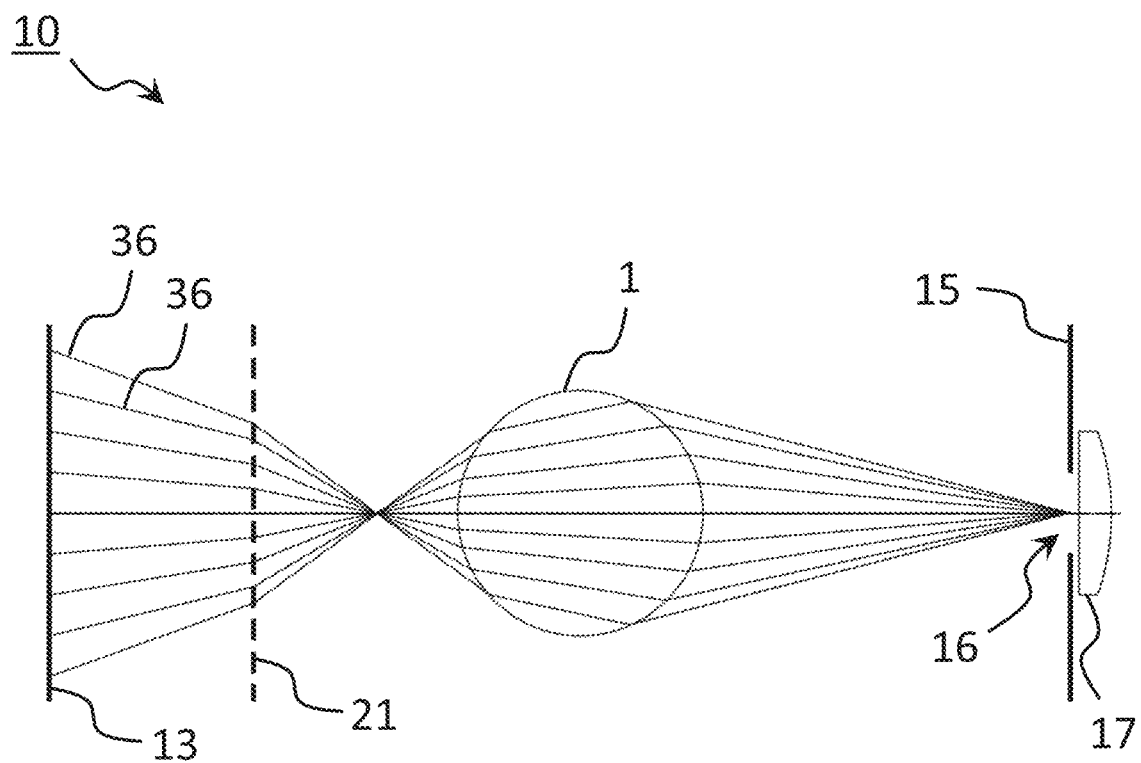
FIG. 3A is a schematic plan view of the path of the main beams of multiple light points on the illumination surface through a container filled with liquid that is positioned in the center of the image field in bright-field illumination.
Figure 3B:
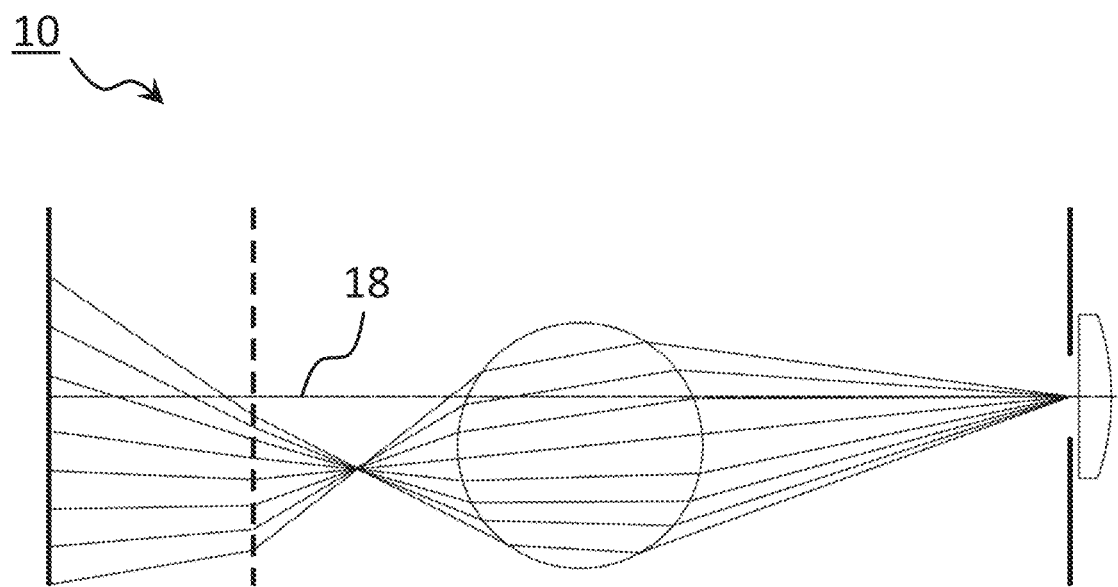
FIG. 3B shows the path of the main beams of multiple light points on the illumination surface through a container filled with liquid that is positioned outside the center of the image field in the view according to FIG. 3A.

The properties of illumination of this kind are demonstrated in the following on the basis of bright-field illumination. FIG. 3A-B schematically show, from above, the path of the main beams 36 starting from a plurality of light points on the illumination surface 13 for a container 1 having liquid contents. The arrangement of the illumination surface 13, the mirror 22, the stop 15 and the lens 17 is the same as in FIG. 2A-B. In this case, the main beams are characterized in that they intersect the center of the entrance pupil 16.

The illumination is bright-field illumination, such that the beam pencil indicated by the main beams 36 impinges upon the entrance pupil 16 of the recording apparatus 14. For the sake of clarity, for each light point on the illumination surface 13, only the main beams 36 are shown, provided that they penetrate the container 1. As for any optical beam path, the relevant beam pencils are defined by the aperture of the system, in this case thus by the entrance pupil 16 of the lens 17.

Figure 4A:
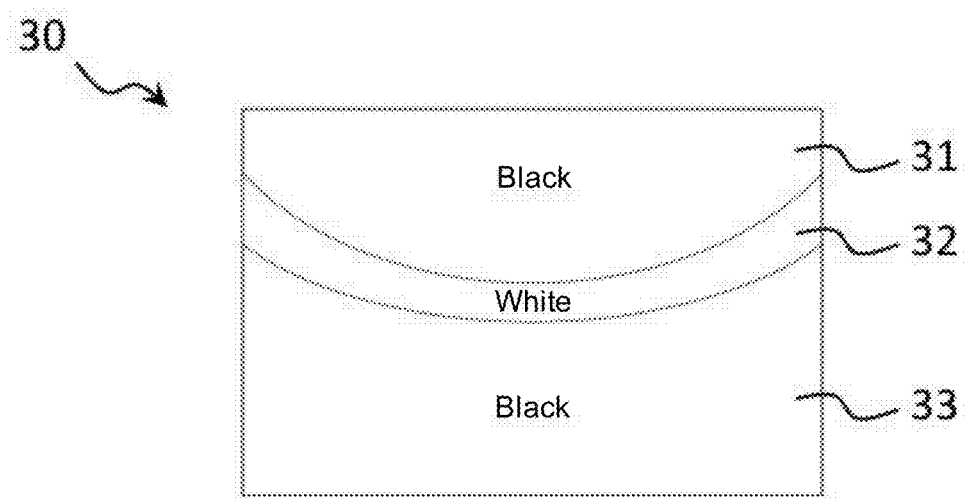
FIG. 4A-C show three embodiments of light patterns for the illumination of the container.

For the bright-field illumination, the light pattern 30 shown schematically in FIG. 4A is used. Instead of a central region for illumination, a curved strip 32 extending over the entire width of the illumination surface 13 is used for the bright-field illumination, the regions 31, 33 being darkened thereabove and therebelow (either by stops or by accordingly programming the illumination surface 13 as described above).

The optimal shape of the strip 32 can e.g. be determined by "backward calculation", by the entrance pupil 16 being assumed to be the "light source" and the imaging thereof through the container 1 via the ellipsoid mirror 22 onto the illumination surface 13 being calculated. In the one-mirror system having 90° beam deflection that is used in the present case, the curved structure for the strip 32 as shown in FIG. 4a is obtained. With an ellipsoid mirror 22, the curved shape results from a highly eccentric ellipsoid segment 24 being used as a collimator, the optical axis 18 of the recording apparatus 14 and the half-axis of the ellipsoid 26 also not extending approximately collinearly. If this were the case, the strip 32 would be straight. Owing to its shape, the curved strip 32 effectively compensates for the distortion of the highly eccentric ellipsoid mirror 22, such that this mirror appears "straight" from the perspective of the camera.

In order to achieve complete illumination, the mirror 22 has to be selected to be large enough to achieve a desired image field, for example an image field of 16°. In general, the size of the mirror or mirrors 22 of the mirror system 20 depends on the desired image field within which the inspection is intended to take place, and on the required illumination of the container 1 (i.e. on the maximum diameter and height thereof). Since the shaded region 31, 33 of the illumination surface 13 is still significantly smaller than the maximum possible illumination surface that the mirror 22 can image, the "hard" character of the bright-field illumination remains (e.g. for detecting streaks). The enlarged illumination surface 13 is in fact advantageous for finding defects in glass (e.g. local cracks in glass). This surface additionally ensures that the defects are irradiated from multiple directions and are thus reliably identified.

If the illuminated container 1 moves perpendicularly to the optical axis 18 of the lens 17, the ideal light pattern 30, i.e. the shape of the curved strip 32, changes only slightly. If, for example, the container 1 moves out of the optical axis 18 (from the perspective of the camera) to the right, a strip 32 that is shifted and/or skewed to the left is thus obtained. The exact shape of the curved strip 32 for a certain container position depends on the distances between the optical components, on the container diameter and on the refractive index of the liquid contained therein.

These slight shifts are already taken into account in the light pattern 30 shown in FIG. 4A by the ideal strip 32 resulting for each container position for the relevant movement range of the container 1 having been combined to form a common area, i.e. to form a common, accordingly widened or shaped strip-shaped region 32. In other words, the curved strip 32 shown constitutes a superimposition of all the ideal curves 32 for the entire movement path of the container 1. Furthermore, the strip 32 is mirror-symmetrical to the plane which is spanned by the optical axis 18 of the lens 17 and the optical axis 18 deflected by the mirror 22. The container 1 is thus ideally illuminated at any position within the image field of the camera.

This symmetry of the light pattern 30 can be abandoned if, for highly demanding applications, the light pattern 30 is supposed to track the movement of the container 1 over time. Deviations from the symmetry remain low, however; the light pattern 30, which has been optimized for the central position of the container 1, is substantially only shifted over time. Further optimization for each illuminated container position is of course possible, but is rarely necessary.

In particular, the device 10 according to the invention is designed such that the above-described properties with regard to the uniform illumination of the container 1 for a movement range of up to ±50 mm perpendicularly to the plane of symmetry are provided.

Figure 4B:
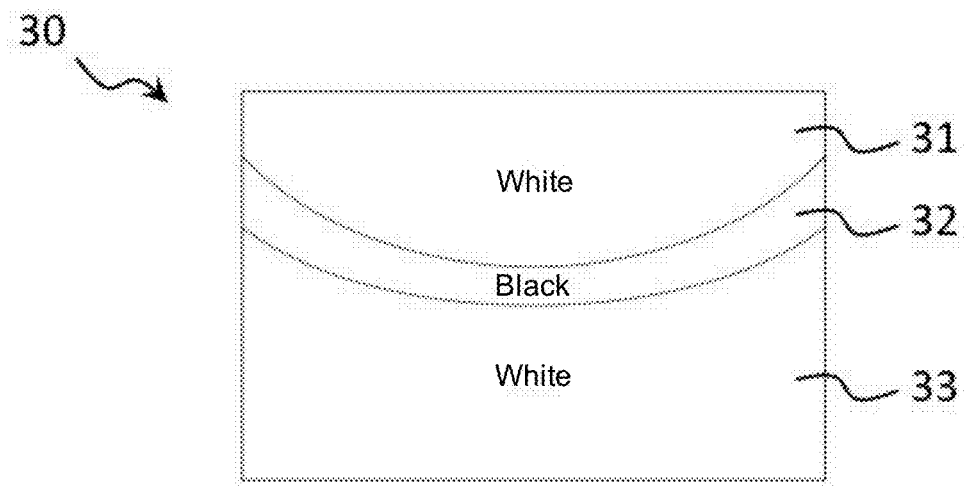

This adaptation of the light pattern 30 applies equally to the dark-field illumination. The corresponding light pattern 30 for the dark-field illumination is shown in FIG. 4B and corresponds to the inverted light pattern 30 of the bright-field illumination (FIG. 4A). As a result, the entire container surface appears dark at any position within the image field of the camera. Since the shaded area 32 is still small compared with the total illumination surface 13, this additional shading barely restricts the lighting effect at all. The large remaining illumination surface still ensures that particles in the liquid are illuminated from all possible directions such that, even with highly irregular particle surfaces (e.g. glass particles and fibers), the probability is very high that light from a particle is also scattered into the entrance pupil 16 at all times and the particle is illuminated brightly in the image, with a very high bright-dark contrast at the same time. The same also applies to cracks in glass, the visibility of which can likewise highly depend on the direction of incidence of the light. Dark-field illumination that is optimized for cylindrical containers 1 filled with liquid is thus obtained by the light pattern 30 shown in FIG. 4B.

In FIG. 3A, the container 1 is located in the center of the camera field (i.e. the container axis lies in the plane of symmetry). In FIG. 3B, the container 1 has been moved "downwards" (i.e. to the left from the perspective of the camera). These figures show that, with a sufficiently wide illumination surface 13 and a sufficiently dimensioned collimator or mirror system 20, very good illumination of the liquid column is achieved despite the high refractive power of the "cylindrical container lens", and specifically also if the container 1 moves out of the plane of symmetry.

Figure 4C:
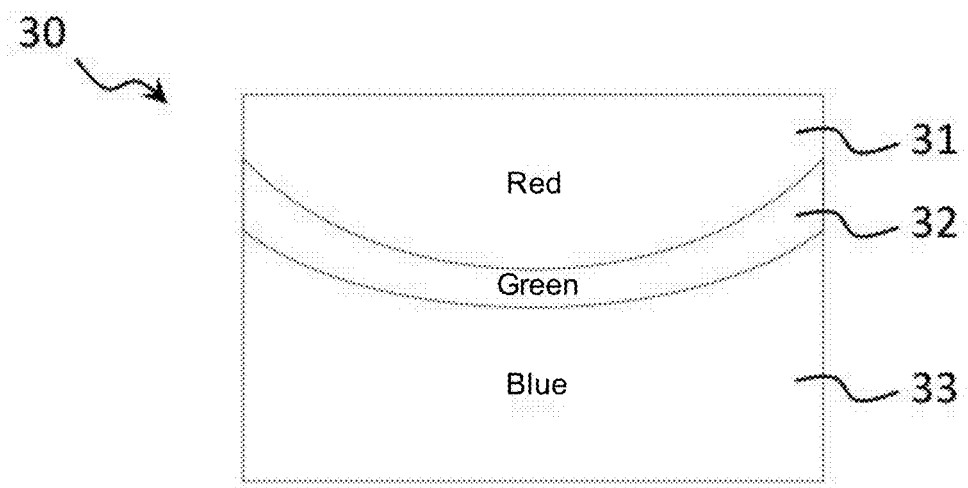

FIG. 4C shows a light pattern 30 for a combined bright-field and dark-field illumination, with the regions 31 and 33 emitting light at different wavelengths (or wavelength ranges). The third, curved region 32 emits another wavelength, which is different from regions 31 and 33. For example, the region 31 emits red light, the region 32 emits green light and the region 33 emits blue light. Here, a color camera is in particular used to detect a color image. By means of corresponding spectral separation, certain disruptions, such as air bubbles in the liquid, can be detected in a further improved manner. In addition to visible light, other wavelengths, for example in the UV, X-ray or infrared range, can also be used.

FIG. 5A-F show light shining through a container 1 filled with water (the photographs of the container 1 captured by the recording apparatus 14 are shown in the left-hand column) in bright-field illumination with different light patterns 30 (these are shown in the right-hand column).

The container 1 filled with liquid constitutes a container lens, which ensures that light from a single collimated (not diffuse) light source only enters the recording apparatus 14 in a narrow strip in the center of the container 1, in parallel with the container axis. This can be seen in FIG. 5A, in which a light pattern 30 having a small, centrally illuminated region is used for the illumination. The edge regions of the container 1 do not have light shone therethrough from the perspective of the recording apparatus 12 (in other words, the cylindrical container lens vertically produces a highly compressed image of the light, which is imaged out of focus via the recording apparatus 12).

Figure 5A:
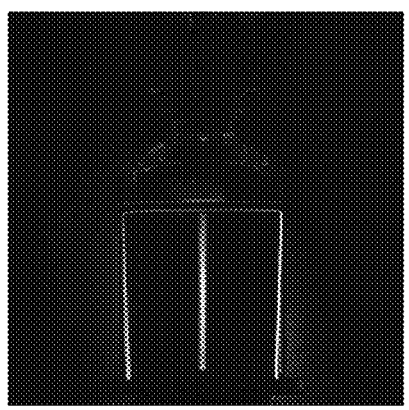
FIG. 5A-F show images of a glass container filled with water (left column) in bright-field illumination with different light patterns (right column).
Figure 5A:
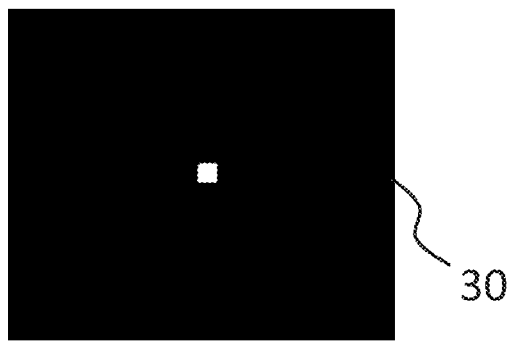
Figure 5B:
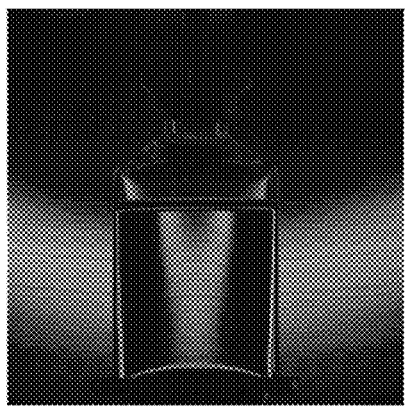
Figure 5B:
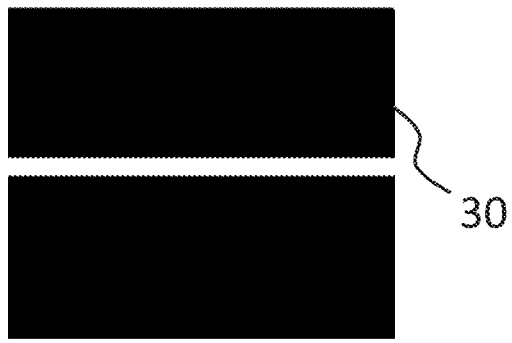
Figure 5C:
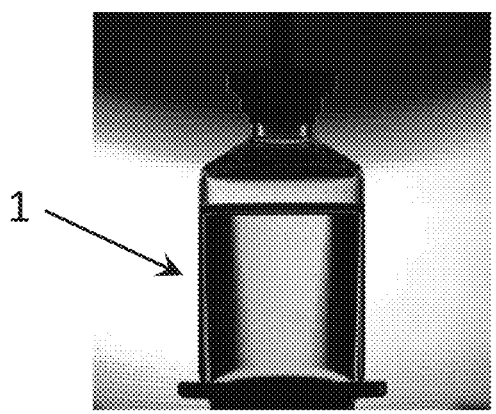
Figure 5C:
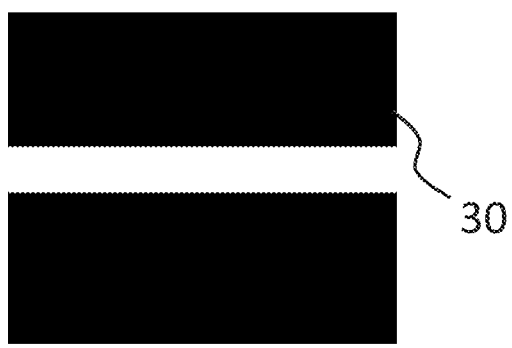
Figure 5D:
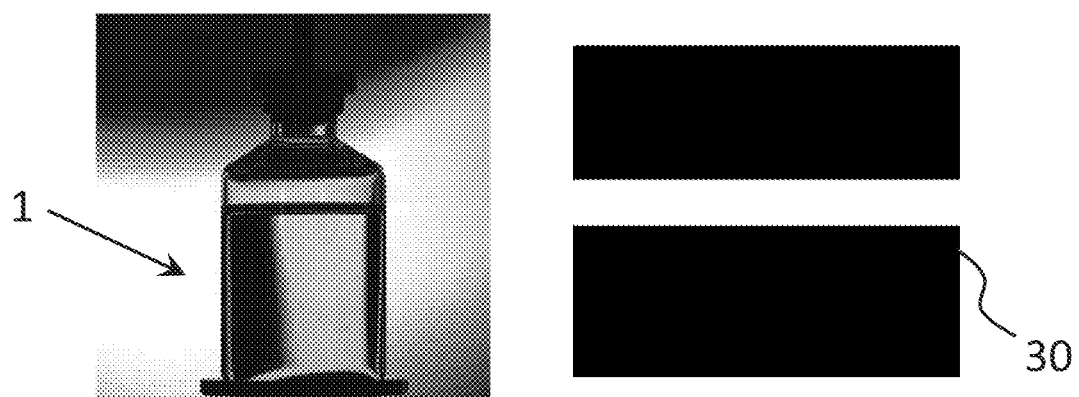
Figure 5E:
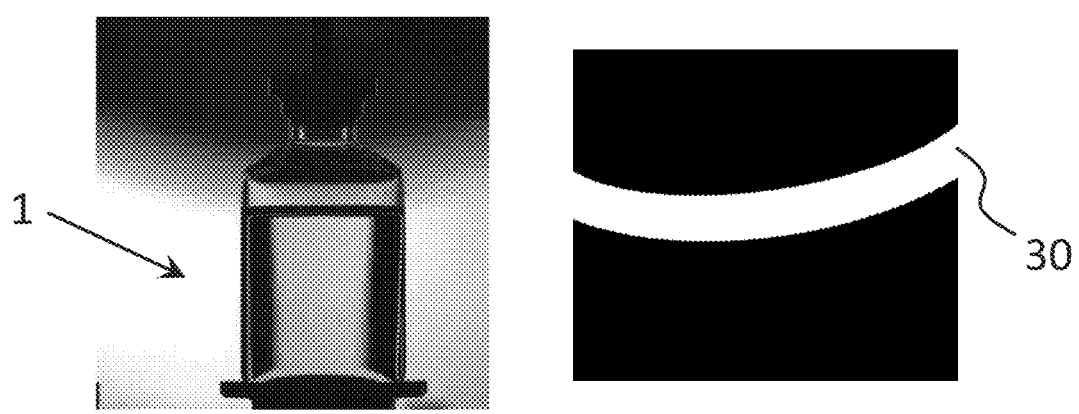
Figure 5F:
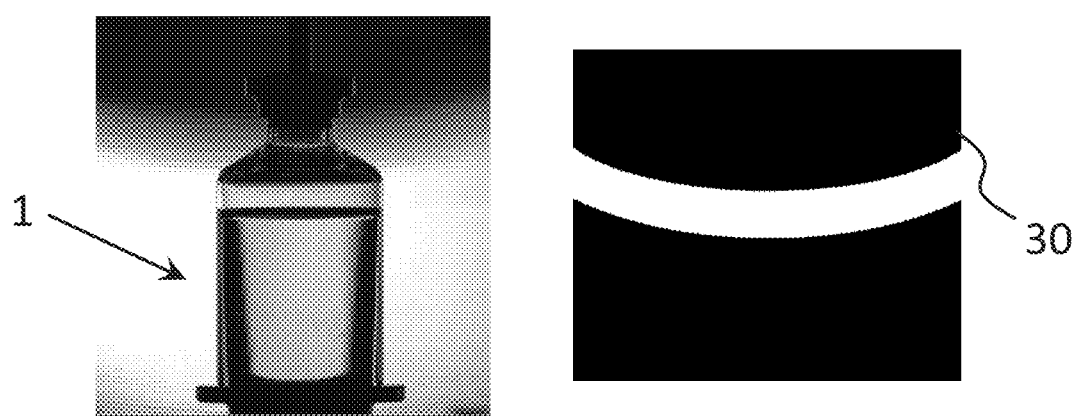

By adapting the light pattern 30, bright-field illumination having significantly improved illumination can be achieved. If the small, central illumination surface is replaced with an illuminated strip that extends over the entire width of the illumination surface 13, the illumination is significantly improved (cf. FIG. 5b-c). In a one-mirror system 20 having 90° beam deflection, as in the present embodiment, the best illumination result is obtained using the curved light pattern 30 shown in FIG. 5E-F (and identified by backward calculation), as described above. In FIGS. 5D and 5E, the container 1 is shifted to the right relative to the central optical axis 18 from the perspective of the camera.

In addition to the low costs, the device according to the invention provides improved inspection quality and easier adjustability and modifiability than comparable inspection systems.

The device 10 according to the invention can be used in many applications, with the detection of particles, streaks and defects in glass being described by way of example in the following.

The identification of foreign particles in the liquid in the container 1 is one of the most important inspections for pharmaceutical products. The requirements placed on the inspection (in particular with regard to the reliability when differentiating between "good" and "bad" products) are very high and cannot always be fulfilled. In the particle inspection, dark-field illumination is preferably used. Here, the image field is intended to appear dark within the liquid column, but particles within the liquid are intended to scatter the light from the illumination used towards the recording apparatus 14 or lens 17 and to thus be illuminated brightly in the image.

The intensity of the light from the illumination unit 12 scattered by particles towards the lens 17 depends to a high degree on the random orientation of the particles in the beam path. This applies in particular to glass particles and fibers. In order to nevertheless ensure sufficient brightness in the camera image irrespective of the current orientation at any time, it is necessary for light to impinge upon the particles from as many different directions as possible, i.e. at as many different angles as possible.

This is often insufficient with the illumination that is usually used. Therefore, the particles that are moving in the liquid are not always visible, and therefore they cannot be reliably identified over multiple images (the container contents are typically set in rapid rotation ("upward rotation") before the inspection so that the particles become detached from the base of the container 1 move around in the liquid during the inspection). This may result in a misinterpretation and thus in an incorrect inspection result.

The device 10 according to the invention comprising the mirror system 20 used as a collimator is ideal for the above-described requirement due to the large aperture that can be attained (large mirror surface 24), since each point in the container 1 is irradiated from many different directions/angles, irrespective of the position of the container 1 and without deviating from the principle of dark-field illumination. As a result, particles (in particular glass particles that are difficult to detect in the liquid) can be reliably detected over the entire movement range of the containers 1 and are automatically tracked in an image series.

A comparatively new requirement is to identify streaks in the liquid in the containers 1 in order for it to be possible to check whether an optimal solution is present or whether phase separation of individual fractions has occurred. Bright-field illumination is usually used when inspecting for streaks (but dark-field illumination is also possible in principle). The illumination of the image is adjusted such that the image field within the liquid column appears consistently bright in an ideal case (e.g. mean gray-scale value). Streaks become noticeable by means of bright-dark structures in the image on the basis of the difference in the refractive index of different liquids or solutions. The contrast can be varied by adapting the light pattern 30. The large mirror diameter guarantees identical conditions over a large movement range of the containers 1.

The identification of defects in glass is intended to eliminate all the products which, due to defects in the surface or glass, do not allow the contents to continue to be inspected safely, are unsaleable or even entail the risk of the breakage of glass or contamination of the contents. Defects in glass, including scratches, flaws, cracks, breakages and inhomogeneities in the material, can be detected using bright-field and dark-field illumination. The mode of action is, in principle, the same as that used in particle and streak inspection. In particular, the visibility of cracks can highly depend on the angle of incidence of the illumination light (similarly to glass particles). The large light fan becomes important here, which can be achieved by means of the mirror system 20 used as a collimator according to the invention.

LIST OF REFERENCE SIGNS 1 container
10 device
11 stop
12 illumination unit
13 illumination surface
14 recording apparatus
15 stop
16 entrance pupil
17 lens
18 optical axis of lens
20 mirror system
21 main plane of mirror system 22 concave mirror
24 mirror surface
26 ellipsoid
30 light pattern
31 region of the light pattern
32 region of the light pattern
33 region of the light pattern
34 beam fan
36 main beam

The invention claimed is:

1. A device for optically inspecting a container that is empty or filled with liquid, comprising an illumination unit having an illumination surface and a recording apparatus, wherein it is possible for the illumination unit to produce a two-dimensional light pattern consisting of at least two regions of different light intensities and for the container to be irradiated with light of the light pattern, in particular for said light to shine therethrough, and wherein it is possible for the recording apparatus to detect an image of the container irradiated by the illumination unit, wherein a mirror system which is arranged in a beam path between the illumination unit and the container and which comprises at least one concave mirror, which images the light pattern onto a plane of an entrance pupil of the recording apparatus; and wherein the concave mirror comprises an ellipsoid mirror surface and is arranged such that a first focal point of the ellipsoid defining the mirror surface lies on the light pattern and a second focal point lies on the entrance pupil of the recording apparatus.

2. The device according to claim 1, wherein the mirror system does not comprise a lens.

3. The device according to claim 1, wherein a deflection angle of the concave mirror is less than 135°, preferably less than 100°.

4. The device according to claim 1, wherein bright-field illumination and/or dark-field illumination and/or a combined bright-field and dark-field illumination having different wavelengths for the bright-field and the dark-field illumination is produced by the illumination unit.

5. The device according to claim 1, wherein the container is moved by a transport apparatus, wherein an illumination apparatus, the mirror system and the recording apparatus preferably are arranged such that an optical axis of the recording apparatus is oriented substantially perpendicularly to a movement direction of the container and it is possible for the container to be illuminated by the illumination apparatus along a section of a movement path of said container and for the image of the container to be detected by the recording apparatus.

6. The device according to claim 1, wherein the illumination unit can produce a light pattern which comprises at least one dark region that does not emit any light and/or which comprises at least two regions that emit light at different wavelengths.

7. The device according to claim 4, wherein a spatial arrangement and/or the light intensities and/or the wavelengths of the regions of the light pattern is varied.

8. The device according to claim 1, wherein the light from the illumination unit does not impinge upon a container surface in parallel, wherein the light pattern is being imaged on the container surface.

9. The device according to claim 1, wherein the illumination surface is a TFT screen or an LED matrix that preferably comprises individually actuatable LEDs.

10. The device according to claim 1, wherein at least one stop, which is arranged between the illumination surface and the mirror system, is provided for producing the light pattern.

11. The device according to claim 5, wherein a region of the light pattern is in particular designed as a curved strip, which is preferably oriented symmetrically to the optical axis of the recording apparatus.

12. The device according to claim 1, wherein a polarizing filter is provided, by means of which a polarization of the light emitted by the illumination unit can be modified.

13. The device according to claim 1, wherein the recording apparatus comprises a camera and preferably a lens arranged between the container and the camera.

14. The device according to claim 1, wherein the container is cylindrical and completely or partly transparent, wherein the container preferably is a syringe, a vial, an ampoule or a cartridge.

* * * * *